US011482053B2

(12) United States Patent
Schilling et al.

(10) Patent No.: US 11,482,053 B2
(45) Date of Patent: Oct. 25, 2022

(54) GOOD PROCESSING APPARATUS

(71) Applicant: Francotyp-Postalia GmbH, Berlin (DE)

(72) Inventors: Tilmann Schilling, Berlin (DE); Joachim Jauert, Berlin (DE); Michael Fersch, Berlin (DE)

(73) Assignee: Francotyp-Postalia GmbH, Berlin (DE)

( * ) Notice: Subject to any disclaimer, the term of this patent is extended or adjusted under 35 U.S.C. 154(b) by 89 days.

(21) Appl. No.: 16/682,763

(22) Filed: Nov. 13, 2019

(65) Prior Publication Data

US 2020/0151966 A1 May 14, 2020

(30) Foreign Application Priority Data

Nov. 13, 2018 (DE) ..................... 10 2018 128 360.1

(51) Int. Cl.
*G06F 9/00* (2006.01)
*G07B 17/00* (2006.01)

(52) U.S. Cl.
CPC ... *G07B 17/00193* (2013.01); *G07B 17/0008* (2013.01); *G07B 17/00314* (2013.01); *G07B 17/00508* (2013.01); *G07B 2017/00112* (2013.01); *G07B 2017/00258* (2013.01); *G07B 2017/00266* (2013.01); *G07B 2017/00322* (2013.01); *G07B 2017/00532* (2013.01)

(58) Field of Classification Search
CPC .......... G07B 17/00193; G07B 17/0008; G07B 17/00314
USPC .......................................................... 705/410
See application file for complete search history.

(56) References Cited

U.S. PATENT DOCUMENTS

| | | | |
|---|---|---|---|
| 4,138,735 A | 2/1979 | Allocca et al. | |
| 5,606,508 A | 2/1997 | Thiel | |
| 5,926,506 A | 7/1999 | Berthold et al. | |
| 8,004,858 B2 | 8/2011 | Jauert et al. | |
| 8,510,233 B1 * | 8/2013 | Leon ................ | G07B 17/00024 705/410 |
| 2007/0078778 A1 | 4/2007 | Ferraro | |
| 2009/0119219 A1 * | 5/2009 | Bleumer .......... | G07B 17/00733 705/62 |
| 2009/0150305 A1 * | 6/2009 | Montbrun .......... | G07B 17/0008 705/410 |
| 2010/0106290 A1 * | 4/2010 | Isles .......................... | B07C 3/20 700/227 |
| 2010/0128072 A1 * | 5/2010 | Wagner ............ | G07B 17/00193 347/5 |
| 2012/0232970 A1 * | 9/2012 | Kara ................ | G07B 17/00024 705/14.4 |

FOREIGN PATENT DOCUMENTS

| | | |
|---|---|---|
| DE | 4213278 C2 | 2/1998 |
| EP | 773517 B1 | 8/2005 |
| EP | 1615174 A2 | 1/2006 |
| EP | 2390846 B1 | 11/2016 |

* cited by examiner

*Primary Examiner* — Ahshik Kim
(74) *Attorney, Agent, or Firm* — Banner Witcoff Ltd.

(57) ABSTRACT

This disclosure relates to a good processing apparatus with a first communication module. The first communication module is connected to a controller. The good processing apparatus is designed to accommodate at least one second communication module. The controller is designed to determine whether the second communication module is ready for operation.

15 Claims, 2 Drawing Sheets

GOOD PROCESSING APPARATUS

CROSS REFERENCE TO RELATED APPLICATIONS

This patent application claims priority to German Patent Application No. 102018128360.1, filed Nov. 13, 2018, which is incorporated herein by reference in its entirety.

BACKGROUND

Field

The disclosure relates to a good processing apparatus with at least two communication modules and a controller. The good processing apparatus may be a franking machine equipped with an ink printing device for producing imprints on a flat good. Each individual communication module includes a different transmission technology.

Related Art

U.S. Pat. No. 4,138,735 describes a system for simultaneously writing current postage charge tables to remote memories. The system also comprises carrier wave transmission. Optionally a direct telephonic reception is provided. However, the data transmission is exclusively analog. A digital transmission is not planned.

EP773517B1 describes a system for use on postage franking machines. For automatic modem recognition, a sequence of signals is transmitted, whereupon the modem responds with a transmission to the franking machine microprocessor. In this solution, the modem type is recognized digitally, but the subsequent data transmission then takes place analog via a serial interface (telephone line). Digital transmission is therefore not possible here either.

DE4213278C2 relates to an arrangement for franking mailing goods. The transportable franking machine has storage means and means for receiving data which can be transmitted via a transmission means. The postage amounts consumed by the franking machine are debited from a credit which can be loaded via the transmission means, preferably a mobile communication standard, or a chip card. Although the transmission is digital, it is disadvantageous that not all transmission methods (e.g. Bluetooth and WLAN), which are common nowadays, are available.

U.S. Patent Application Publication No. US20070078778A1 describes a method used to connect a service provider to a franking machine. First, a franking machine is provided at a first location, where the franking machine has a communication interface. In addition, a server will be provided at a central location remote from the first location. Then a connection via a mobile communication interface and the communication interface of the franking machine is made and a secure communication channel between the mobile communication interface and the server is established. The disadvantage is that it only covers the (even if digital) mode of transmission via a mobile network—in this case GSM via GPRS. The transmission rates are low. No further transmission methods are proposed.

EP1615174A2 describes an arrangement with a communication unit in a device with a security housing. The non-security area of the device in a corresponding area a communication unit is arranged. This communication unit can be an analog or digital modem, ISDN unit, wireless LAN unit, UMTS unit, Bluetooth unit or any other pluggable communication unit. The disadvantage is that the communication unit is located outside the security housing and can therefore be physically manipulated. Furthermore, it is only a single communication unit and not a plurality of such units.

Finally, EP2390846 B1 concerns a franking system with an electronic data processing device and data memories connected to these on the input side, and a franking machine. The latter has an interface for a connection between the data processing device and a data center for the bidirectional transmission of signals which can only be processed digitally. In particular, the franking system comprises a transmission unit connected to the interface of the franking machine and formed by a plurality of main components, the first main component of which is designed to support the franking machine in performing modem functions. In addition to the data transmission link between the data processing device of the transmission unit connected to the first main component and the data center, a second main component of the transmission unit for wireless transmission of data between the franking system and the data center and a third main component of the transmission unit for selective or simultaneous wire-guided data transmission to the data center and back are connected in parallel.

In this case it is only a single communication unit, which comprises three main components. The disadvantage of this is that if this one communication unit fails, for example due to operational reasons, the entire communication of the franking system also fails. Also, if a repair is required, the entire communication unit must be replaced with all existing functions, even though, for example, only the third main component (wired communication) has failed. This increases the repair costs unnecessarily. In addition, the system does not automatically recognize which components are to be used. In case of doubt, the energy efficiency of the module is therefore not optimal, as the non-operation of unneeded main components can lead to power savings.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
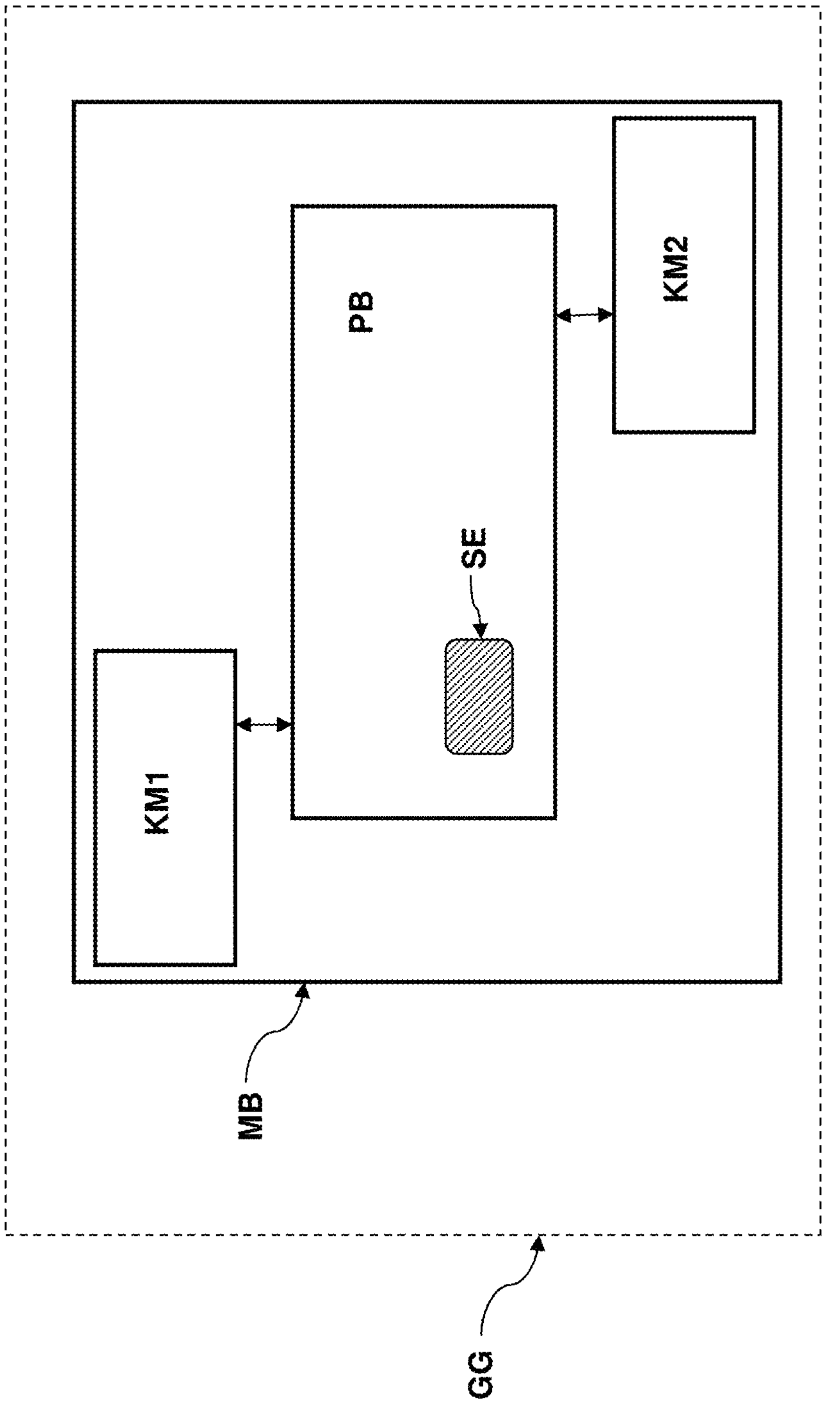
FIG. 1 illustrates a good processing apparatus according to an exemplary embodiment of the disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

In an exemplary embodiment, a good processing apparatus, such as a franking machine, is configured for data transfer in different ways. This data transfer can be done wirelessly and/or wired. Advantageously, both communication methods should be possible. The necessary components are integrated into the good processing apparatus. The components of the good processing apparatus are available in the long term to cover the entire life cycle of the franking machine family. In exemplary aspects, various data transmission standards are possible. One or more components of the good processing apparatus may be optional. In an exemplary embodiment, the availability and characteristics of the communication hardware can be recognized by software.

In an exemplary embodiment, a good processing apparatus includes at least two separate communication modules, both of which can be individually connected to the interfaces of the good processing apparatus. The good processing apparatus can include a controller. The controller can be configured to detect whether a second communication module is ready for operation. In addition, the controller can be configured to determine, if necessary, which type of transmission the communication module shall use.

In an exemplary embodiment, the good processing apparatus, such as a franking machine, includes a first communication module connected to a controller.

In an exemplary embodiment of the disclosure, a good processing apparatus accommodates at least a second communication module. In this example, the controller is configured to determine whether the second communication module is ready-to-operate and to determine what type of communication module the second communication module is.

In an exemplary embodiment, each communication module is configured to perform data transmission according to different communication protocols. For example, the first communication module can perform a data transfer using a wired communication protocol, while the second communication module performs the data transfer using a wirelessly communication protocol. This allows the individual communication modules to be positioned within the good processing apparatus in an optimized manner. For example, a wired communication module can be positioned closer to a corresponding plug connection. In addition, the communication module for wireless data transmission can be positioned at a higher receiving position on the motherboard or, for example, near an antenna or its connection. For example, the position of a communication module with wireless communication capability on a vertically arranged mainboard can be placed at the top and thus at the maximum receiving position In an exemplary embodiment, the good processing apparatus is configured to divide data communication between different separate communication modules to create redundancy, which increases the reliability of the good processing apparatus. If one communication module fails, a separate functional communication module is available for data transmission. Advantageously, in an exemplary embodiment, more than just two communication modules can be provided. Due to the separate communication modules, repair in the event of failure of only one type of communication is easier and more cost-effective.

If necessary, the entire data traffic of the good processing apparatus can then be routed via the functioning communication module.

FIG. 1 schematically shows a good processing apparatus according to an exemplary embodiment of the disclosure.

As shown in FIG. 1, the good processing apparatus GG includes a first communication module KM1 and a second communication module KM2, which are each arranged on the mainboard MB. Both communication modules KM1, KM2 can provide different types of transmission—wired or wireless. The communication modules KM1, KM2 are wired and/or wireless communication transceivers in one or more embodiments. In these aspects, the transceivers includes one or more hardware components (e.g. radio-frequency components, etc.) and/or processor circuitry configured to perform wired and/or wireless data communications.

In an exemplary embodiment, the communication modules KM1 and KM2 can be configured for both wired or both wireless communications, but use different communication protocols. For example, the first communication module KM1 can be configured for a first wireless communication protocol while the second communication module KM2 is configured to a second wireless communication protocol different from the first communication module KM1. In an exemplary embodiment, the communication modules KM1, KM2 include processor circuitry that is configured to perform one or more functions/operations of the respective communications module, including performing one or more wireless and/or wire communications.

Advantageously, in an exemplary embodiment, the individual communication modules KM1, KM2 are optimally arranged within the GG good processing apparatus. They can, for example, each be plugged into a connector provided for this purpose.

In addition, a processor board PB is arranged on the mainboard MB. In an exemplary embodiment, the processor board PB includes controller SE, or the controller SE is realized with the logic of the processor board PB. In an exemplary embodiment, the processor board PB include processor circuitry configured to perform one or more functions/operations of the processor board PB.

In an exemplary embodiment, the controller SE is configured to recognize, for example via software, logic gates and/or application-specific integrated circuits (ASICs), whether the first and/or second communication module KM1, KM2 is connected, and if necessary, also which type of communication module it is, and which communication types can be used by it. In an exemplary embodiment, the controller SE is configured to control whether the second communication module KM2 is to establish a connection, for example, to a remote data memory or router and which communication type the second communication module KM2 shall use for this purpose. In an exemplary embodiment, the controller SE includes processor circuitry that is configured to perform one or more functions/operations of the controller SE.

Figure 2:
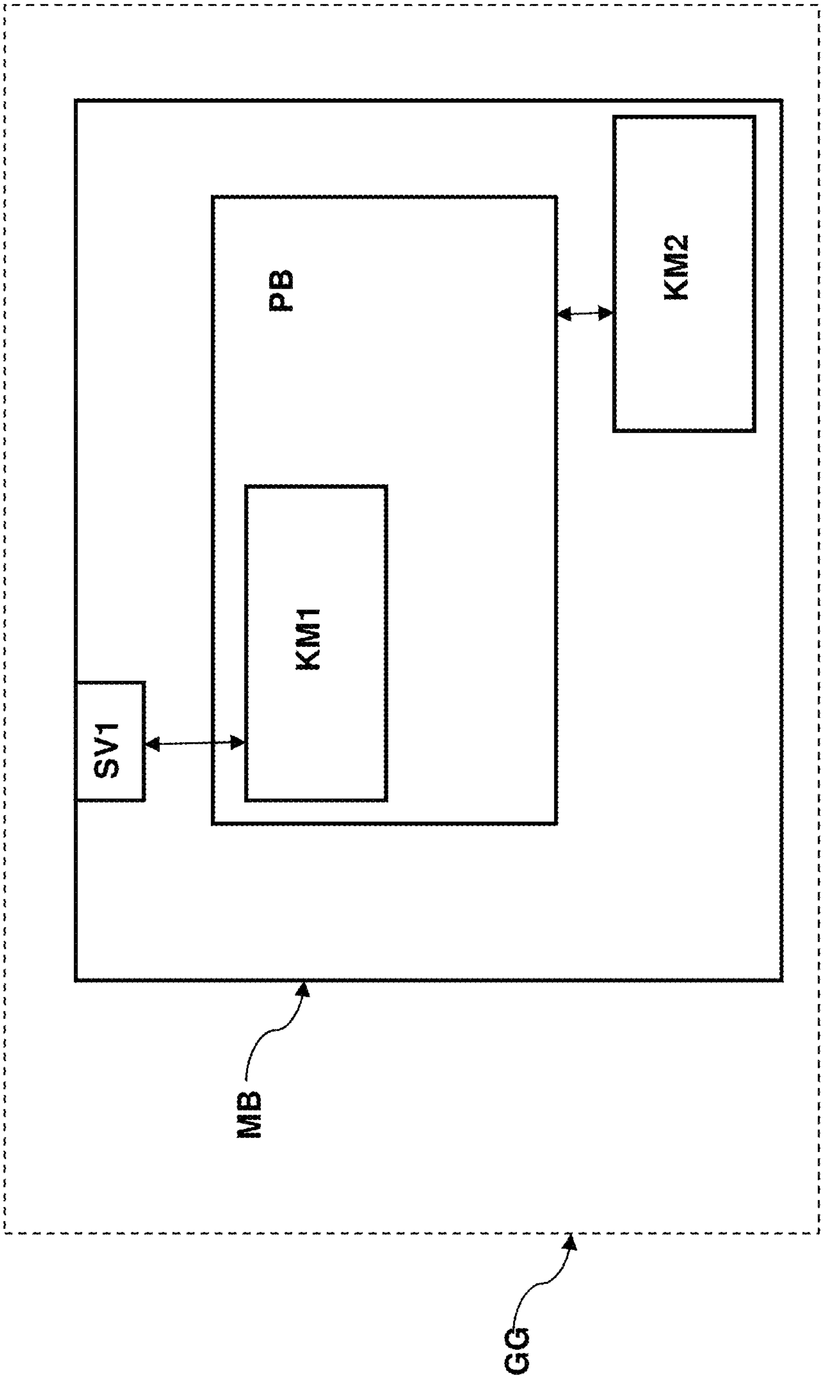
FIG. 2 illustrates a good processing apparatus according to an exemplary embodiment of the disclosure.

FIG. 2 shows a good processing apparatus according to an exemplary embodiment of the disclosure. Similar to the embodiment of FIG. 1, the processor board PB is arranged on the mainboard MB. The controller SE can again be realized with the processor board PB. In comparison to FIG. 1, only wired communication is provided for the first communication module KM1. In an exemplary embodiment, the first communication module KM1 is permanently integrated in the processor board PB, which is also mounted on the motherboard in a non-fixed manner, e.g. plugging, clamping, or in a fixed manner, e.g. soldering. In further embodiments, the first communication module KM1 can also be connected to the processor board PB in another way.

In an exemplary embodiment, the first communication module KM1 is also connected via an electrical line to a plug connector SV1, which is located on the mainboard MB and can be accessed externally.

In an exemplary embodiment, the second communication module KM2 is located on the mainboard MB outside the processor board PB. However, it can also be located at different locations and connected to the mainboard MB e.g. via electrical lines. The electrical connection to the mainboard MB is made e.g. via SPI (Serial Peripheral Interface). In this setup, the second communication module KM2 provides the wireless communication types wireless LAN (WLAN), such as Wi-Fi, and/or Bluetooth. It is also possible that a communication module KM2 is provided which can handle other wireless communication types. This can also include various mobile radio standards such as LTE, UMTS or GSM, or other communication protocols as would be understood by one of ordinary skill in the art.

In an exemplary embodiment, the controller SE is configured to detect, e.g. via software, whether a second communication module KM2 is connected and, if so, what device it is and which communication types it can use. In addition, the controller SE can be used to decide whether the second communication module KM2 is to establish a connection, e.g. to a remote data memory or router, and which communication type the second communication module KM2 shall use for this purpose.

The disclosure is not limited to the form of embodiment described in more detail here, since it is obvious that other embodiments of the disclosure can be developed or used, which—based on the same basic idea of the disclosure—are covered by the attached claims.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

KM1 First communication module
KM2 First communication module
SV1 Plug connector
PB Processor board
MB Mainboard
GG Good processing apparatus
SS1, SS2 Interfaces
SE Controller
A Antenna
AA Connector for antenna

The invention claimed is:

1. A good processing apparatus, comprising:
a first communication module;
a second communication module, wherein the first communication module and the second communication module are arranged separately within the good processing apparatus; and
a controller arranged on a mainboard of the good processing apparatus and connected to the first and second communication modules, wherein, to determine whether the second communication module is ready-to-operate, the controller is configured to:
determine if the second communication module is connected to the good processing apparatus; and
identify a communication module type of the second communication module in response to the second communication module being connected.

2. The good processing apparatus according to claim 1, wherein the first communication module is configured for wired data transmissions.

3. The good processing apparatus according to claim 2, wherein the second communication module is configured for wireless data transmissions.

4. The good processing apparatus according to claim 1, wherein the second communication module is configured for wireless data transmissions.

5. The good processing apparatus according to claim 1, wherein the first communication module and/or the second communication module are logically and electrically connected to the controller.

6. The good processing apparatus according to claim 1, wherein the controller is configured to:

establish a connection with the second communication module and, by evaluating determined data, to detect whether the second communication module is switched on and/or connected; and/or determine and/or to recognize which type of wireless communication the second communication module is configured.

7. The good processing apparatus according to claim 1, wherein the first communication module and/or the second communication module are respectively connected to a mainboard of the good processing apparatus via respective first and second interfaces.

8. The good processing apparatus according to claim 7, wherein the second interface is realized via a plug connector.

9. The good processing apparatus according to claim 1, further comprising an antenna arranged in a housing of the good processing apparatus, the first communication module and/or the second communication module being configured to wireless communicate via the antenna.

10. The good processing apparatus according to claim 1, wherein the second communication module is configured to take over at least a part of data traffic necessary for operation of the good processing apparatus and/or at least a part of the data traffic arising for realization of additional services.

11. The good processing apparatus according to claim 1, wherein the good processing apparatus is a franking machine equipped with an ink printing device for producing imprints on a flat good.

12. The good processing apparatus according to claim 1, wherein the first communication module and the second communication module are arranged separately from each other on the mainboard of the good processing apparatus.

13. The good processing apparatus according to claim 1, wherein the first communication module is arranged on the mainboard of the good processing apparatus and the second communication module is arranged externally of the mainboard at a different location within the good processing apparatus.

14. A good processing apparatus, comprising:

a first communication module;

a second communication module, wherein the first communication module and the second communication module are arranged separately from each other on a mainboard of the good processing apparatus;

a controller connected to the first and second communication modules, wherein, to determine whether the second communication module is ready-to-operate, the controller is configured to:

determine if the second communication module is connected to the good processing apparatus; and identify a communication module type of the second communication module in response to the second communication module being connected.

15. A good processing apparatus, comprising:

a first communication module is arranged on a mainboard of the good processing apparatus;

a second communication module arranged externally of the mainboard at a different location within the good processing apparatus;

a controller connected to the first and second communication modules, wherein, to determine whether the second communication module is ready-to-operate, the controller is configured to:

determine if the second communication module is connected to the good processing apparatus; and identify a communication module type of the second communication module in response to the second communication module being connected.

* * * * *